(12) United States Patent
Tour et al.

(10) Patent No.: US 7,879,940 B2
(45) Date of Patent: Feb. 1, 2011

(54) POLYMERIZATION INITATED AT SIDEWALLS OF CARBON NANOTUBES

(75) Inventors: James M. Tour, Bellaire, TX (US);
Jared L. Hudson, Houston, TX (US);
Ramanan Krishnamoorti, Bellaire, TX (US); Koray Yurekli, Cengelkoy (TR);
Cynthia A. Mitchell, Houston, TX (US)

(73) Assignee: William Marsh Rice University, Houston, TX (US)

( * ) Notice: Subject to any disclaimer, the term of this patent is extended or adjusted under 35 U.S.C. 154(b) by 916 days.

(21) Appl. No.: 10/561,253

(22) PCT Filed: Jun. 21, 2004

(86) PCT No.: PCT/US2004/019769
§ 371 (c)(1),
(2), (4) Date: Dec. 19, 2005

(87) PCT Pub. No.: WO2005/030858
PCT Pub. Date: Apr. 7, 2005

(65) Prior Publication Data
US 2006/0142466 A1      Jun. 29, 2006

Related U.S. Application Data

(60) Provisional application No. 60/480,348, filed on Jun. 20, 2003.

(51) Int. Cl.
*B60C 1/00*      (2006.01)
*C08F 4/46*      (2006.01)

(52) U.S. Cl. ...................... 524/495; 526/173

(58) Field of Classification Search .................. 524/495; 977/902; 526/173
See application file for complete search history.

(56) References Cited

U.S. PATENT DOCUMENTS 3,287,298 A      11/1966  D'Alelio 3,554,992 A  *  1/1971  Lamb et al. ................... 526/88

FOREIGN PATENT DOCUMENTS

| WO | WO 02/60812 |   | 8/2002 |
| WO | WO 02/060812 | * | 8/2002 |
| WO | WO 2004/046031 |   | 6/2004 |

OTHER PUBLICATIONS

Ebbesen et al., "Large-scale Synthesis of carbon nanotubes", 358 Nature (1992), pp. 220-222.

(Continued)

*Primary Examiner*—William K Cheung
(74) *Attorney, Agent, or Firm*—Winstead PC

(57) ABSTRACT

The present invention is directed to aryl halide (such as aryl bromide) functionalized carbon nanotubes that can be utilized in anionic polymerization processes to form polymer-carbon nanotube materials with improved dispersion ability in polymer matrices. In this process the aryl halide is reacted with an alkyllithium species or is reacted with a metal to replace the aryl-bromine bond with an aryl-lithium or aryl-metal bond, respectively. It has further been discovered that other functionalized carbon nanotubes, after deprotonation with a deprotonation agent, can similarly be utilized in anionic polymerization processes to form polymer-carbon nanotube materials. Additionally or alternatively, a ring opening polymerization process can be performed. The resultant materials can be used by themselves due to their enhanced strength and reinforcement ability when compared to their unbound polymer analogs. Additionally, these materials can also be blended with pre-formed polymers to establish compatibility and enhanced dispersion of nanotubes in otherwise hard to disperse matrices resulting in significantly improved material properties. The resultant polymer-carbon nanotube materials can also be used in drug delivery processes due to their improved dispersion ability and biodegradability, and can also be used for scaffolding to promote cellular growth of tissue.

30 Claims, 5 Drawing Sheets

OTHER PUBLICATIONS

Ebbesen et al., "Carbon Nanotubes", 24 Ann. Rev. of Mater. Sci. (1994), pp. 235-264.

Iijima et al., "Helical microtubules of graphitic carbon", 354 Nature (1991), pp. 56-58.

Saito et al., Physical Properties of Carbon Nanotubes, 1998, London: Imperial College Press; Sun et al., Nature, 2000, 403:384.

Qin et al., "Electron microscopic imaging and contrast of smallest carbon nanotubes", 349 Chem. Phys. Lett. (2001), pp. 389-393.

Wang et al., "Single-walled 4 A carbon nanotube arrays", 408 Nature (2000), pp. 50-51.

Hafner et al., "Catalytic growth of single-wall carbon nanotubes from metal particles", 296 Chem. Phys. Lett. (1998), pp. 195-202.

Cheng et al., "Bulk morphology and diameter distribution of single-walled carbon nanotubes synthesized by catalytic . . . ", 289 Chem. Phys. Lett. (1998), pp. 602-610.

Nikolaev et al., "Gas-phase catalytic growth of single-walled carbon nanotubes from carbon monoxide", 313 Chem. Phys. Lett. (1999), pp. 91-97.

Thess et al., "Crystalline Ropes of Metallic Carbon Nanotubes", 273 Science (1996), pp. 483-487.

Vander Wal et al., "Flame and Furnace Synthesis of Single-Walled and Multi-Walled . . . ", 105(42) J. Phys. Chem. B. (2001), pp. 10249-10256.

Rao, et al., "Functionalised carbon nanotubes from solutions" Chem. Commun. (1996), pp. 1525-1526.

Wong, et al., "Covalently functionalized nanotubes as nanometre-sized probes in chemistry and biology", 394 Nature (1998), pp. 52 55.

Liu, et al., "Fullerene Pipes", 280 Science (1998), pp. 1253-1256.

Chen, et al., "Chemical attachment of organic functional groups to single-walled carbon nanotube material", 282 Science (1998), pp. 95-98.

Aihara, "Lack of superaromaticity in Carbon Nanotubes", 98 J. Phys. Chem. (1994), pp. 9773-9776.

Chen, Y. et al., "Chemical attachment or organic functional groups to single-walled carbon nanotube material", 13 J. Mater Res. (1998), pp. 2423-2431.

Bahr et al., "Covalent chemistry of single-wall carbon nanotubes" 12 J. Mater. Chem. (2002), pp. 1952-1958.

Banerjee et al., "Rational Chemical Strategies for Carbon Nanotube Functionalization" 9 Chem. Eur. J. (2003), pp. 1898-1908.

Holzinger et al., Sidewall Functionalization of Carbon Nanotubes, 40(21) Angew. Chem. Int. Ed. (2001), pp. 4002-4005.

Bahr et al., "Dissolution of small diameter single-wall carbon nanotubes in organic solvents", Chem. Commun. (2000), pp. 193-194.

Dyke, et al., "Solvent-Free Functionalization of Carbon Nanotubes," 125 J. Am. Chem. Soc. (2003), pp. 1156-1157.

Bahr, et al., "Highly Functionalized Carbon Nanotubes Using in Situ Generated Diazonium Compounds," 13 Chem. Mater. (2001), pp. 3823-3824.

Bahr et al. "Functionalization of Carbon Nanotubes by Electrochemical Reduction of Aryl Diazonium Salts: . . . ", 123 J. Am. Chem. Soc. (2001), pp. 6536-6542.

Storey et al.,"Kinetics and Mechanism of the Stannous Octoate-Catalyzed Bulk Polymerization of epsilon-caprolactone", 35 Macromolecules (2002), pp. 1504-1512.

Kowalski et al., "Kinetics and mechanism of cyclic esters polymerization initiated with tin(II) octoate, 1", 19 Macromol. Rapid Commun. (1998), pp. 567-572.

Messersmith et al., "Synthesis and Barrier Properties of Poly (epsilon-caprolactone)-Layered Silicate . . . ", J. of Polymer Sci.: Part A, 33 Polymer Chem. (1995), pp. 1047-1057.

Bratcher, et al., "Study in the Dispersion of Carbon Nanotubes", 706 Mat. Res. Soc. Symp. Proc. (2002), pp. Z9.29.2-Z9.29.6.

Ederle, et al., "Carbanions on Grafted C60 as Initiators for Anionic Polymerization", 30(15) Macromolecules (ACS) (1997), pp. 4262-4267.

Shaffer, et al., "Polystyrene grafted multi-walled carbon nanotubes", Chem. Comm. (Sep. 12, 2002), pp. 2074-2075.

\* cited by examiner

POLYMERIZATION INITATED AT SIDEWALLS OF CARBON NANOTUBES

CROSS REFERENCE TO RELATED APPLICATIONS

This Application claims priority to U.S. Provisional Patent Application Ser. No. 60/480,348 filed Jun. 20, 2003.

This invention was made with support from the National Aeronautics and Space Administration, Grant Nos. NASA-JSC-NCC-9-77 and TEES 68371, passed through from NASA-URETI NCC-01-0203; the National Science Foundation, Grant No. NSR-DMR-0073046; and the U.S. Air Force Office of Scientific Research, Grant No. F49620-01-0364.

FIELD OF THE INVENTION

The present invention relates generally to processes for growing polymer chains via anionic polymerization, and/or alternatively via ring opening polymerization, from the sidewalls of functionalized carbon nanotubes, which will facilitate greater dispersion in polymer matrices and greatly enhanced reinforcement ability in polymeric material.

BACKGROUND

Fullerenes are closed-cage molecules composed entirely of $sp^2$-hybridized carbons, arranged in hexagons and pentagons. Fullerenes (e.g., $C_{60}$) were first identified as closed spheroidal cages produced by condensation from vaporized carbon. Fullerene tubes are produced in carbon deposits on the cathode in carbon arc methods of producing spheroidal fullerenes from vaporized carbon. Ebbesen et al., Nature, 1992, 358:220 and Ebbesen et al., Annual Review of Materials Science, 1994, 24:235-264. Such tubes are referred to herein as carbon nanotubes. Many of the carbon nanotubes made by these processes were multi-wall nanotubes (MWNTs), i.e., the carbon nanotubes resembled concentric cylinders having multiple walls or shells arranged in a manner which can be considered analogous to Russian "nesting dolls." Carbon nanotubes having up to seven walls have been described in the prior art (Ebbesen et al., Annual Review of Materials Science, 1994, 24:235-264; Iijima et al., Nature, 1991, 354:56-58).

Single-wall carbon nanotubes (SWNTs) were discovered in 1993 in soot produced in an arc discharge in the presence of transition metal catalysts. Such SWNTs, comprised of a single tube of carbon atoms, are the smallest of the carbon nanotubes. SWNTs can typically have lengths of up to several micrometers (millimeter-long nanotubes have been observed) and diameters of approximately 0.5 nm-10.0 nm (Saito et al., Physical Properties of Carbon Nanotubes, 1998, London: Imperial College Press; Sun et al., Nature, 2000, 403:384), although most have diameters of less than 2 nm (Saito et al.). Diameters as small as 0.4 nm have been reported, but these were formed inside either MWNTs (Qin et al., Chem. Phys. Lett., 2001, 349:389-393) or zeolites (Wang et al., Nature, 2000, 408:50-51). SWNTs, and carbon nanotubes of all types have since been produced by other techniques which include chemical vapor deposition techniques (Hafner et al., Chem. Phys. Lett., 1998, 296:195-202; Cheng et al., Chem. Phys. Lett., 1998, 289:602-610; Nikolaev et al., Chem. Phys. Lett., 1999, 313:91-97), laser ablation techniques (Thess et al., Science, 1996, 273:483-487), and flame synthesis (Vander Wal et al., J. Phys. Chem. B., 2001, 105(42):10249-10256).

Since their discovery, there has been a great deal of interest in the functionalization (sometimes referred to as derivatization) of carbon nanotubes and, more particularly, in single-wall carbon nanotubes, to facilitate their manipulation, to enhance the solubility of such nanotubes, and to make the nanotubes more amenable to blend and composite formation. This is because single-wall carbon nanotubes are one of the more striking discoveries in the chemistry and materials genre in recent years. Nanotubes posses tremendous strength, an extreme aspect ratio, and are excellent thermal and electrical conductors. A plethora of potential applications for nanotubes have been hypothesized, and some progress is being made towards commercial applications. Accordingly, chemical modification of single-wall carbon nanotubes, as well as multi-wall carbon nanotubes, will be necessary for some applications. For instance, such applications may require grafting of moieties to the nanotubes: to allow assembly of modified nanotubes, such as single-wall carbon nanotubes, onto surfaces for electronics applications; to allow reaction with host matrices in polymer blends and composites; and to allow the presence of a variety of functional groups bound to the nanotubes, such as single-wall carbon nanotubes, for sensing applications. And once blended, some applications may benefit from the thermal removal of these chemical moieties, as described in PCT publication WO 02/060812 by Tour et at, filed Jan. 29, 2002 and incorporated by reference herein.

While there have been many reports and review articles on the production and physical properties of carbon nanotubes, reports on chemical manipulation of nanotubes have been slow to emerge. There have been reports of functionalizing nanotube ends with carboxylic groups (Rao, et at, Chem. Commun., 1996, 1525-1526; Wong, et at, Nature, 1998, 394: 52-55), and then further manipulation to tether them to gold particles via thiol linkages (Liu, et at, Science, 1998, 280: 1253-1256). Haddon and co-workers (Chen, et at, Science, 1998, 282:95-98) have reported solvating single-wall carbon nanotubes by adding octadecylamine groups on the ends of the tubes and then adding dichlorocarbenes to the nanotube sidewall, albeit in relatively low quantities (~2%).

Success at covalent sidewall derivatization of single-wall carbon nanotubes has been limited in scope, and the reactivity of the sidewalls has been compared to the reactivity of the basal plane of graphite. Aihara, J. Phys. Chem. 1994, 98:9773-9776. A viable route to direct sidewall functionalization of single-wall carbon nanotubes has been fluorination at elevated temperatures, which process was disclosed in a patent commonly assigned to the assignee of the present Application, U.S. Pat. No. 6,645,455, "Chemical Derivatization Of Single-Wall Carbon Nanotubes To Facilitate Solvation Thereof; And Use Of Derivatized Nanotubes To Form Catalyst-Containing Seed Materials For Use In Making Carbon Fibers," to Margrave et at, issued Nov. 11, 2003. These functionalized nanotubes may either be de-fluorinated by treatment with hydrazine or allowed to react with strong nucleophiles, such as alkyllithium reagents. Although fluorinated nanotubes may well provide access to a variety of functionalized materials, the two-step protocol and functional group intolerance to organolithium reagents may render such processes incompatible with certain, ultimate uses of the carbon nanotubes. Other attempts at sidewall modification have been hampered by the presence of significant graphitic or amorphous carbon contaminants. Chen, Y. et al., J. Mater Res. 1998, 13:2423-2431. For some reviews on sidewall functionalization, see Bahr et al., J. Mater. Chem., 2002, 12:1952; Banerjee et al., Chem. Eur. J., 2003, 9:1898; and Holzinger et al., Angew. Chem. Int. Ed., 2001, 40(21):4002-4005. Within the literature concerning sidewall-functionalization of SWNTs, however, there is a wide discrepancy of solubility values between reports. This is due to explicable variations in filtration methods.

A more direct approach to high degrees of functionalization of nanotubes (i.e., a one step approach and one that is compatible with certain, ultimate uses of the nanotubes) has been developed using diazonium salts and was disclosed in a co-pending application commonly assigned to the assignee of the present Application. See PCT publication WO 02/060812 by Tour et al., filed Jan. 29, 2002 and incorporated herein by reference. Using pre-synthesized diazonium salts, or generating the diazonium species in situ, reaction with such species has been shown to produce derivatized SWNTs having approximately 1 out of every 20 to 30 carbons in a nanotube bearing a functional moiety. Nevertheless, because of the poor solubility of SWNTs in solvent media, such processes require extraordinary amounts of solvent for the dissolution and/or dispersion of the SWNTs (~2 L/g coupled with sonication in most cases). See Bahr et al., Chem. Commun., 2000, 193-194, incorporated herein by reference.

Another method by which carbon nanotubes can be functionalized under solvent-free conditions has been developed. See PCT publication application US03/122072 by Tour et al., filed Jul. 15, 2003 and incorporated herein by reference. As extremely large quantities are typically required to dissolve or disperse carbon nanotubes, solvent elimination renders the processes more favorable for scale-up. Such processes are also amenable to a wide variety of chemical reactions and organic functionalizing agents.

PCT publication WO 02/060812, by Tour, et al., further discloses that, once the functional group is attached to the sidewall of the carbon nanotube, standard polymerization techniques can then be employed to grow the polymer from the functional group in situ. That is, the functional group attached to the nanotube could be used as a starting point for polymer growth. Such standard polymerization techniques could be any of the standard known types, such as radical, cationic, anionic, condensation, ring-opening, methathesis, or ring-opening-metathesis (ROMP) polymerizations, when appropriate groups are bound to the nanotubes. The functional group attached to the nanotube would be a chemically active part of the polymerization, which would result in a composite material in which the nanotubes are chemically involved.

SUMMARY

It has been discovered that aryl halide (such as aryl bromide) functionalized carbon nanotubes can be utilized in anionic polymerization processes to form polymer-carbon nanotube materials with improved dispersion ability in polymer matrices. In this process the aryl halide is reacted with an alkyllithium species or is reacted with a metal to replace the aryl-bromine bond with an aryl-lithium or aryl-metal bond, respectively. It has further been discovered that other functionalized carbon nanotubes, after deprotonation with a deprotonation agent, can similarly be utilized in anionic polymerization processes to form polymer-carbon nanotube materials. Additionally or alternatively, a ring opening polymerization process can be performed. The resultant materials can be used by themselves due to their enhanced strength and reinforcement ability when compared to their unbound polymer analogs. Additionally, these materials can also be blended with pre-formed polymers to establish compatibility and enhanced dispersion of nanotubes in otherwise hard to disperse matrices resulting in significantly improved material properties. The resultant polymer-carbon nanotube materials can also be used in drug delivery processes due to their improved dispersion ability and biodegradability, and can also be used for scaffolding to promote cellular growth of tissue.

The foregoing has outlined rather broadly the features of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

The present invention relates generally to processes for growing polymer chains via polymerization from the sidewalls of functionalized carbon nanotubes, which will facilitate greater dispersion in polymer matrices and greatly enhanced reinforcement ability in polymeric material.

For the present invention, aryl bromide functionalized nanotubes can be utilized that were made using the processes disclosed in PCT publication application US03/22072 PCT or, alternatively, by the processes disclosed in publication WO 02/060812. (See also Dyke, C. A.; Tour, J. M. "Solvent-Free Functionalization of Carbon Nanotubes," J. Am. Chem. Soc., 2003, 125, 1156-1157 or Bahr, J. L.; Tour, J. M. "Highly Functionalized Carbon Nanotubes Using in Situ Generated Diazonium Compounds," Chem. Mater. 2001, 13, 3823-3824 or Bahr, J. L.; Yang, J.; Kosynkin, D. V.; Bronikowski, M. J.; Smalley, R. E.; Tour, J. M. "Functionalization of Carbon Nanotubes by Electrochemical Reduction of Aryl Diazonium Salts: A Bucky Paper Electrode," J. Am. Chem. Soc. 2001, 123, 6536-6542; all of which are incorporated by reference). Such functionalization reactions can involve HiPco-produced individual carbon nanotubes (Carbon Nanotechnologies Inc., Houston, Tex.). Alternatively, the carbon nanotubes can be functionalized with other aryl halides bonded to the sidewalls. Further alternatively, the carbon nanotubes can be functionalized with a species having nucleation sites for the polymerization, such as species having carbon, sulfur, oxygen, and nitrogen sites for polymerization.

Figure 1:
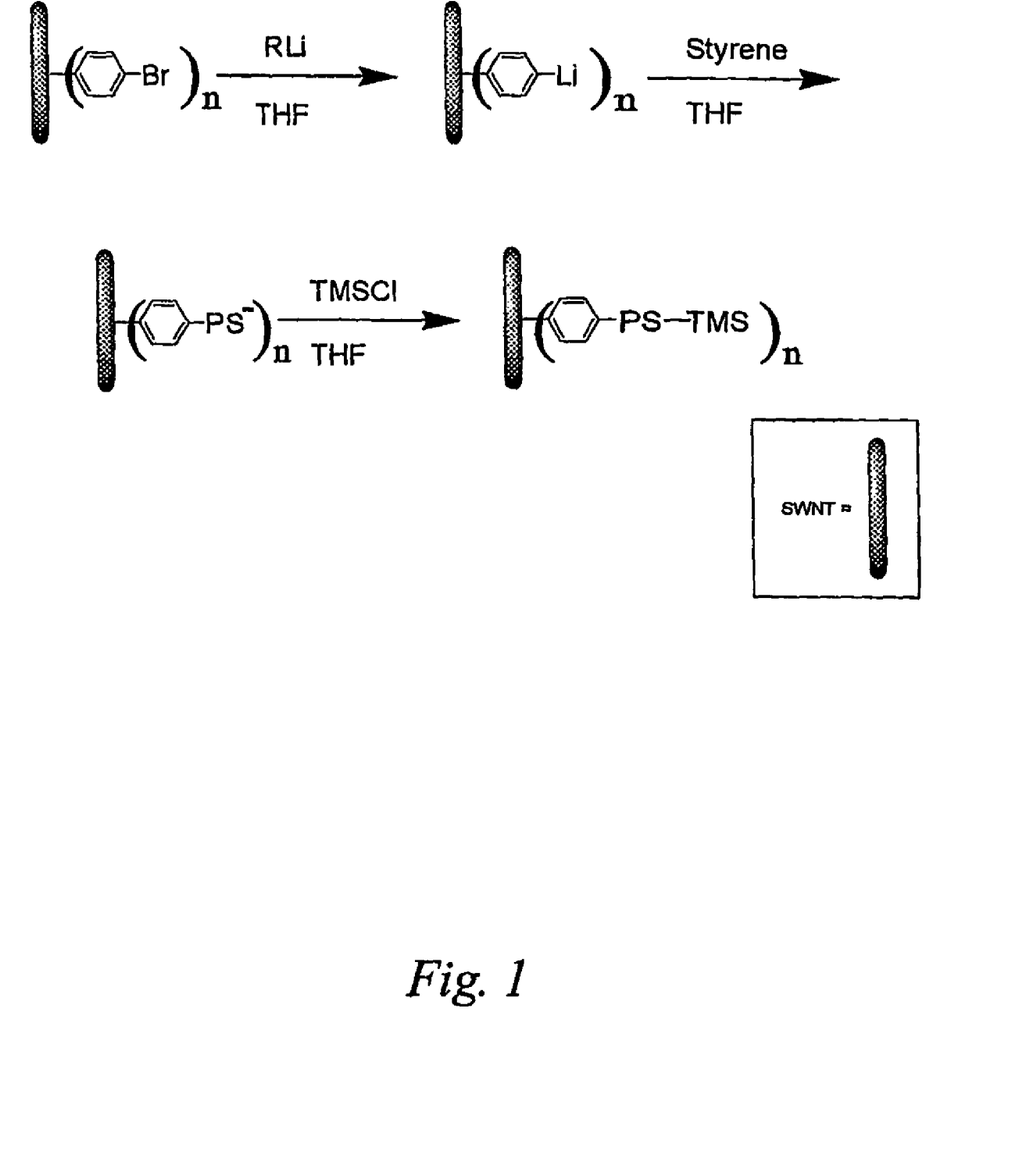
FIG. 1 schematically depicts an embodiment of the invention in which aryl bromide functionalized carbon nanotubes are used as the origin for polymerization.

As reflected in FIG. 1, aryl bromide functionalized nanotubes can be dispersed in a solvent with an alkyllithium species (RLi), which can be, for example, provided as a tetrahydrofuran solution of n-butyllithium. The concentration of the solution can be in the range between about 0.1 and 1.0 mg/ml. The nanotube material may then be allowed to settle and the excess n-butyllithium solution optionally may be removed via canulation. The remaining nanotube material may be washed, such as with three portions of dry tetrahydrofuran, to thoroughly remove any residual n-butyllithium. The nanotube material may then be dispersed in a solvent, such as dry tetrahydrofuran.

After dispersion, a monomer, such as, for example, stryrene is added to the reaction vessel. Other monomers can be utilized, such as those selected from the group consisting of styrene, acrylates, methyl acrylates, vinyl acetate, vinyl pyridines, isoprene (such as 1,4-isoprene), butadiene (such as 1,3-butadiene, 2-methyl-1,3-butadiene, 2-methyl-1,4-butadiene), chloroprene, acrylonitrile, maleic anhydride, and combinations thereof. The concentration of the monomer is in the range between about 0.03 and 0.16 g/ml The temperature at polymerization is typically in the range between about 0 and 50° C.

An anionic polymerization process is employed utilizing the functionalized carbon nanotubes and the monomer, wherein the polymerization can be effected by an anionic initiator.

Upon completion of the anionic polymerization, the active chain ends can be terminated with an appropriate terminating agent, such as ethanol, acetaldehyde, trimethylsilyl chloride, or combinations thereof. The average chain length of the polymer bonded to the carbon nanotubes are generally in the range between about 5 and about 1 million, and can more specifically be in the range between about 1000 and about 1 million. After termination, the reaction mixture may be diluted and filtered to remove any large particulate. The filtrate can then be concentrated under reduced pressure and precipitated into methanol. The resultant powder can be collected via filtration and dried under vacuum to a constant weight.

Figure 2:
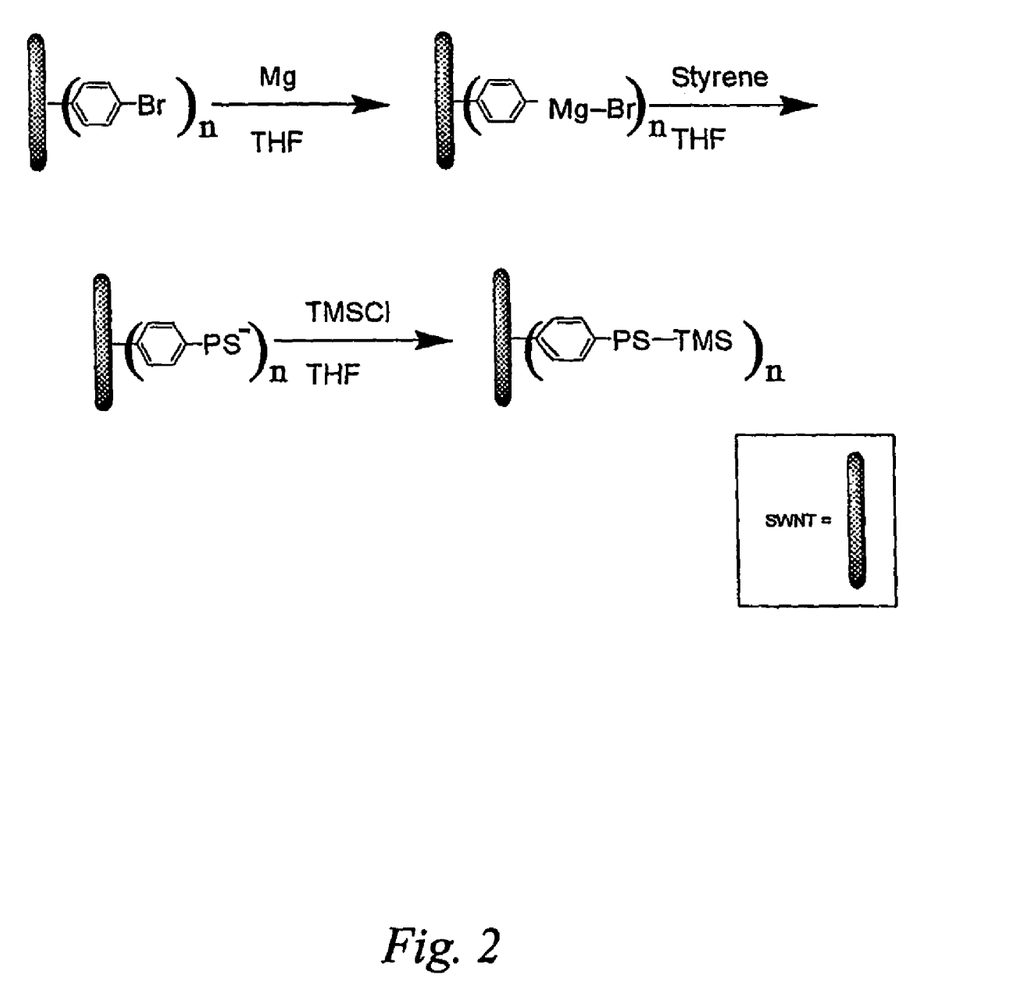
FIG. 2 schematically depicts another embodiment of the invention in which aryl bromide functionalized carbon nanotubes are used as the origin for polymerization.

FIG. 2 reflects an alternative embodiment of the invention in which a Grignard synthesis is utilized in lieu of reacting the functionalized carbon nanotubes with the alkyllithium species. Optionally, for such Grignard synthesis, a catalyst, such as $TiCl_4$, may be utilized during the polymerization process. Like processes to this Grignard synthesis can be performed by utilizing other metals that will react with the functionalized carbon nanotube to convert the aryl-halide bond to an aryl-metal bond. Such metals include zinc, nickel, potassium, sodium, lithium, cesium, palladium, and combinations thereof (and also combinations of these metals with Mg).

Furthermore, as an alternative to utilizing aryl halide functionalized carbon nanotubes, carbon nanotubes functionalized with a species having nucleation sites operable for polymerization (such as species having carbon, sulfur, oxygen, and nitrogen sites for polymerization) can be utilized. For example, phenol functionalized carbon nanotubes, thiophenol functionalized carbon nanotubes, phenethyl alcohol functionalized nanotubes ($CNT-C_6H_4—CH_2CH_2OH$), and $CNT-C_6H_4—NHBoc$ can be used.

Figure 3:
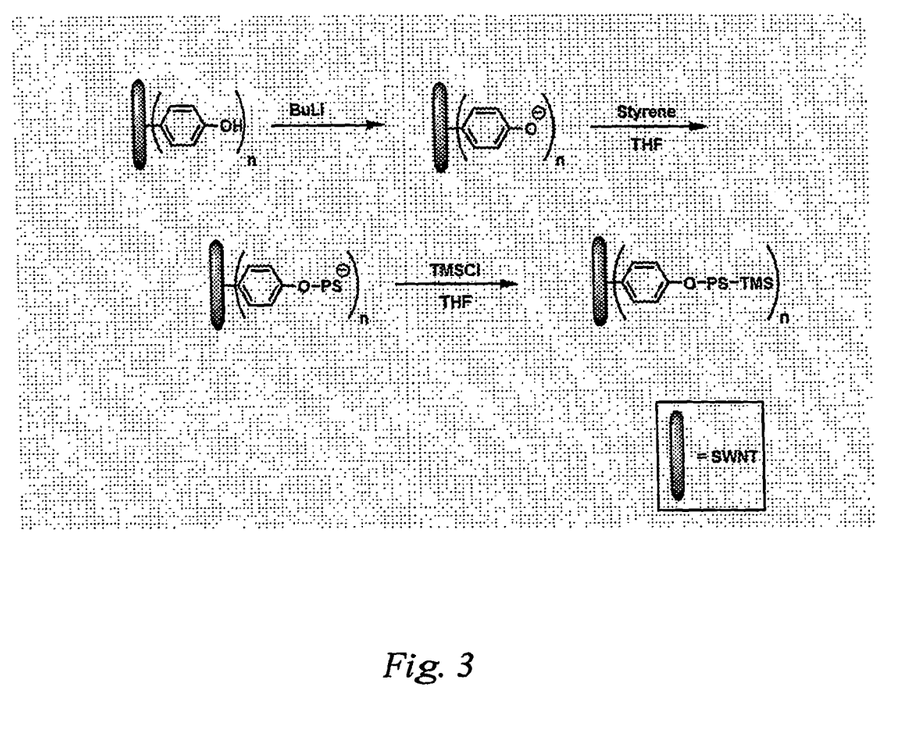
FIG. 3 schematically depicts another embodiment of the invention in which phenol functionalized carbon nanotubes are used as the origin for polymerization.

FIG. 3 reflects an alternative embodiment of the invention in which phenol functionalized carbon nanotubes are utilized during the anionic polymerization process to make the polymer-carbon nanotube materials. Carbon nanotubes functionalized with species having nucleation sites for polymerization, such as phenol functionalized carbon nanotubes, are then treated with a deprotonation agent to deprotonate the nucleation sites to form initiator groups for polymerization. Such deprotonation agents include bases (such as KOH, KH, NaOH, NaH, and potassium hexamethyldisilazide (KHMDS)) and metals (such as zinc, nickel, potassium, sodium, lithium, magnesium, cesium, palladium, and combinations thereof) that will react with the functionalized carbon nanotubes to deprotonate the functionalized species. After deprotonatination, the anionic polymerization process can be performed, such as in the manner described above.

The resultant materials of the anionic polymerization processes may then be used as is or blended with other matrices to obtain superior dispersion and reinforcement properties. For instance nanocomposites thus synthesized using 1,3-butadiene can be saturated to form tethered analogs of low density polyethylene that form miscible mixtures with high density polyethylene resulting in nanocomposites where nanotubes are dispersed in a HDPE matrix with superior material properties. Similarly, starting from 1,4-isoprene followed by saturation will lead to the formation of a strictly alternating copolymer of ethylene and propylene that is compatible with many commercial grades of ethylene-propylene elastomers. Additionally, preparation of high vinyl butadiene based polymers by polymerization in a highly polar solvent will lead to the tethering of copolymers of 1,4-1,2 polybutadienes with high 1,2 content resulting in compatibility with isotactic, syndiotactic and atactic polypropylenes.

Figure 4:
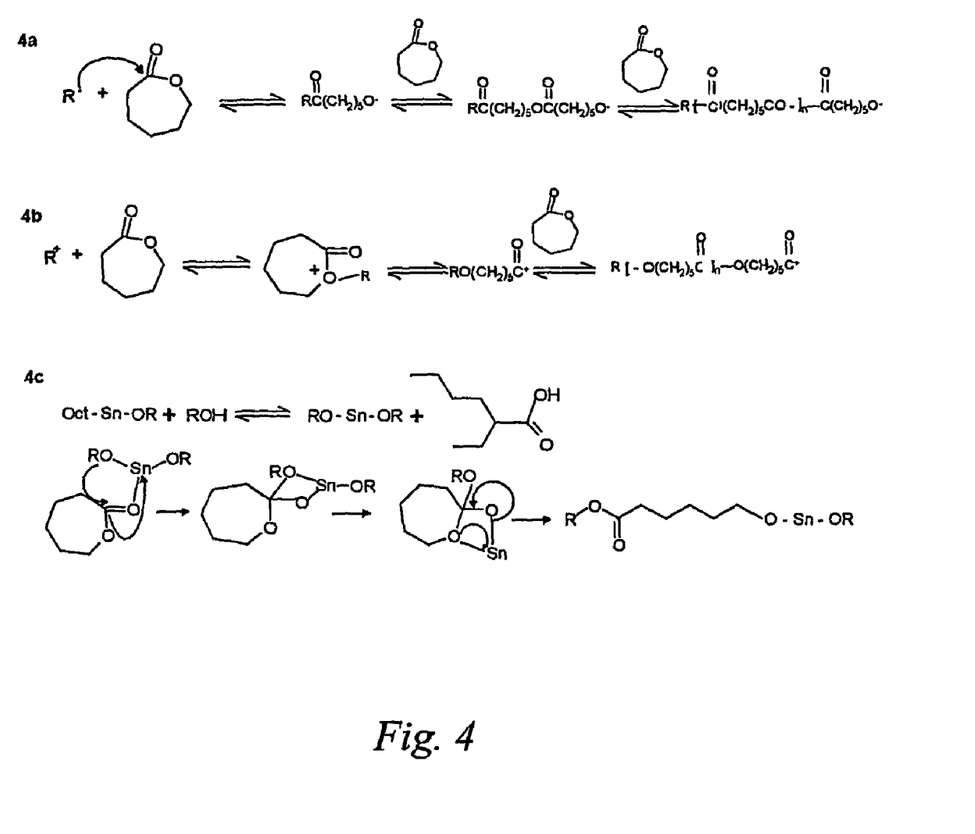
FIGS. 4(a)-(c) schematically depict ring opening polymerization processes that can be utilized in another embodiment of the invention.
Figure 5:
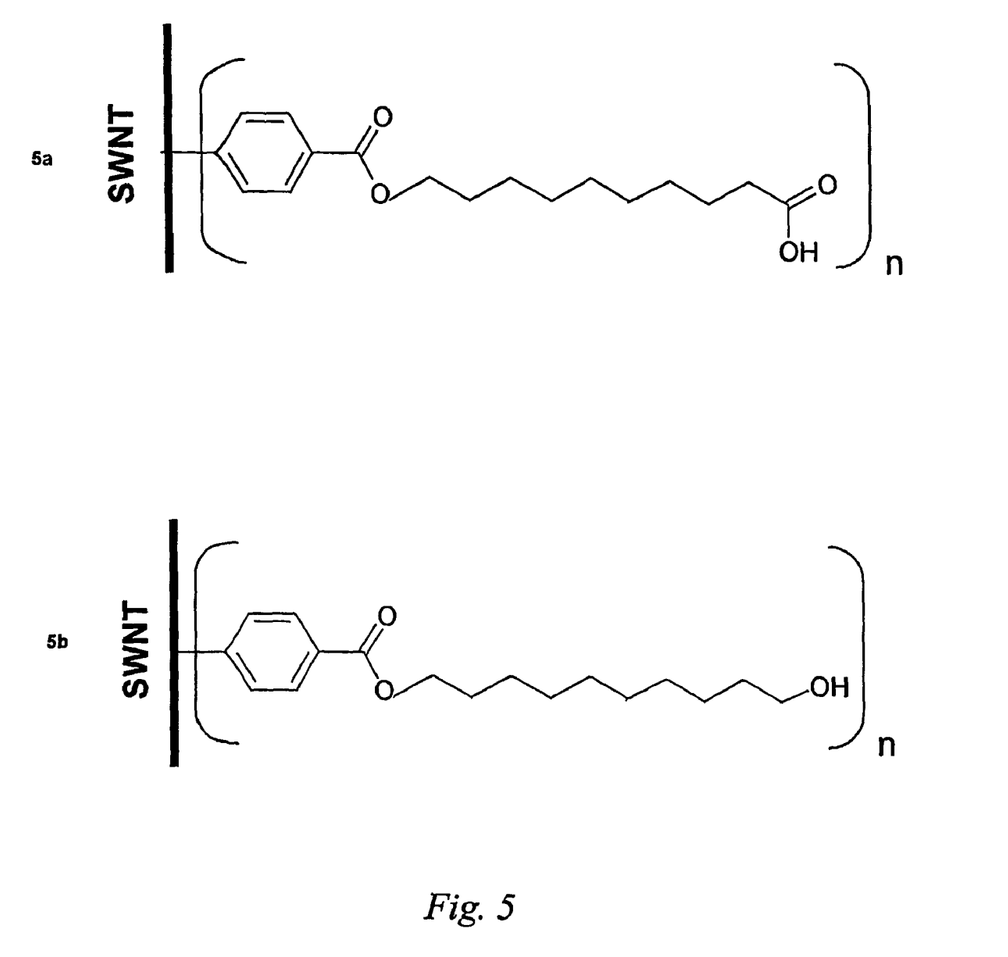
FIGS. 5(a)-(b) are functionalized SWNT that can be used in embodiments of the invention.

Some embodiments of the present invention involve a ring opening polymerization utilizing a ring opening polymerization initiator. For instance, ring opening polymerization of ε-caprolactone is initiated by a number of different types of catalysts utilizing various co-initiators such as alcohols, carboxylic acids or amines. Mechanisms for the polymerization of PCL are presented in FIGS. 4(a)-(c). Polymerization of s-caprolactone proceeds by anionic (4(a)), cationic (4(b)), or a coordination insertion type mechanism (4(c)) [Storey and Sherman, "kinetics and Mechanism of the Stannous Octoate-Catalyzed Bulk Polymerization of epsilon-caprolactone", Macromolecules, 2002, 35, 1504-1512]. Depending on experimental conditions and reagents used, it is understood that that all three mechanisms may possibly occur simultaneously. In the present Application, it is further understood that the alcohol or acid functionality covalently bound to the SWNT can thus act as nucleophile (via the conjugate base, as in FIG. 4(a)) or can participate in forming the alkoxide that initiates the polymerization as in FIG. 4(c). Polymerizations were conducted under several experimental conditions: (i) in bulk at 130° C. utilizing a tin octoate based catalyst [Storey and Sherman, "Kinetics and Mechanism of the Stannous Octoate-Catalyzed Bulk Polymerization of epsilon-caprolactone", Macromolecules, 2002, 35, 1504-1512] and either hydroxyl terminus or carboxylic acid terminus functionalized nanotubes (see FIGS. 5(b) and 5(a), respectively), (ii) in solution with toluene as the solvent at 100° C. utilizing a tin octoate based catalyst [Kowalski; Duda and Penczek, "Kinetics and mechanism of cyclic esters polymerization initiated with tin(II) octoate, 1", Macromol. Rapid Commun. 19, 1998, 19, 567-572] and either hydroxyl terminus or carboxylic acid terminus functionalized nanotubes, (iii) acid catalyzed ring opening at 170° C. [Messersmith and Giannelis, "Synthesis and Barrier Properties of Poly(epsilon-caprolactone)-Layered Silicate Nanocomposites", Journal of Polymer Science: Part A: Polymer Chemistry, 1995, 33, 1047-1057] utilizing carboxylic acid terminus functionalized nanotubes, and (iv) polymerization utilizing a tin octoate based catalyst and pristine nanotubes in toluene or any other solvent.

The resultant materials of the ring opening polymerization of ε-caprolactone, l-lactic acid, d-lactic acid, glycolic acid and copolymers of these to obtain superior dispersion, reinforcement, and control micron and sub-micron scale structures and maintain the biocompatibility and biodegradation characteristics of the polymers. PLLA- and PLGA-based microspheres have been used previously for drug delivery applications. Addition of nanotubes and in particular tethering of the polymers to the surface of the nanotube would result in materials with smaller crystals, development of controlled micro or nano particles and higher drug carrying capacity per mass of polymer. Traditional polymeric scaffolds suffer from lack of mechanical integrity particularly when foamed to produce microchannels for the transport of nutrients, growth factors and possible vascularization. The materials described here are mechanically reinforced by the nanotubes and exhibit superior foaming properties resulting from the intimate mixing and attachment of the polymers to the nanotubes. These materials can also be blended with other polymers and other nanoparticles such as gold nanoshells to provide scaffolding and drug delivery mechanisms respectively.

In summary, the present invention provides for the anionic or ring opening polymerization initiated at a functional group, such as aryl bromide and other aryl halides, as well as other carbon nanotubes functionalized with a species having nucleation sites for the polymerization, on the sidewalls of carbon nanotubes.

The following examples are provided to more fully illustrate some of the embodiments of the present invention. It should be appreciated by those of skill in the art that the techniques disclosed in the examples that follow represent techniques discovered by the inventors to function well in the practice of the invention, and thus can be considered to constitute exemplary modes for its practice. However, those of skill in the art should, in light of the present disclosure, appreciate that many changes can be made in the specific embodiments that are disclosed and still obtain a like or similar result without departing from the spirit and scope of the invention.

Example 1

This Example illustrates the growth of a polymer chain from the sidewalls of functionalized SWNTs in accordance with embodiments of the present invention.

Aryl bromide functionalized single wall carbon nanotubes (0.015 g, 0.022 mmol Br) are dispersed in THF (5 mL) and a solution of n-butyllithium (5 mL, 2.19 M in hexane) was added at 23° C. and the solution was allowed to stir for 10 min. The stirring was then turned off and the nanotubes were allowed to settle out of solution. After settling, the excess n-butyllithium solution was removed from the reaction vessel via cannula and the nanotubes were washed 3 times with dry THF (10 mL) to remove unreacted n-butyllithium.

The flask was then charged with dry THF (10 mL) and the tubes were dispersed in solution with rapid stirring. Styrene (1.7 mL, 15 mmol) was added to the reaction vessel and the mixture was stirred for 180 min before adding ethanol (1 mL) or a function terminator of choice such as trimethylsilyl chloride. The mixture was then diluted with 100 mL dichloromethane and filtered through Fisherbrand P8 filter paper to remove any large particulate. The filtrate was concentrated under reduced pressure and precipitated into methanol. The resulting gray powder (product) was then collected by filtration, using Whatman 41 filter paper and dried under vacuum (0.1 mm) to a constant weight (typically, 0.100-1.00 g depending on the precise amount of styrene added).

Example 2

This Example illustrates the growth of a polymer chain from the sidewalls of functionalized SWNTs via a ring opening polymerization process in accordance with embodiments of the present invention.

A flask was charged with dry toluene (100 mL) and 4-(10-Hydroxydecyl)benzoate functionalized SWNTs were dispersed in the toluene with rapid stirring. $\epsilon$-caprolactone (12 mL) was added to the reaction vessel and the mixture stirred at room temperature for 10 minutes. The amount of functionalized nanotube was adjusted to achieve composites with 0.1 to 5 wt % nanotubes. The solution was then placed in an oil bath and rapidly heated to 100° C. and allowed to equilibrate for 15 minutes under vigorous stirring. Tin octoate in stoichiometric equivalence to the hydroxyl concentration was added and the reaction allowed to proceed for 48 hours. The mixture was then cooled to room temperature (23° C.) and subsequently precipitated in hexane. The samples were repeatedly dissolved in toluene and precipitated in hexane to remove any excess monomer. The samples (product) were then dried under vacuum (0.1 mm) at 80° C. for a minimum of 24 hours to a constant weight (within 0.01 grams).

All patents and publications referenced herein are hereby incorporated by reference. It will be understood that certain of the above-described structures, functions, and operations of the above-described embodiments are not necessary to practice the present invention and are included in the description simply for completeness of an exemplary embodiment or embodiments. In addition, it will be understood that specific structures, functions, and operations set forth in the above-described referenced patents and publications can be practiced in conjunction with the present invention, but they are not essential to its practice. It is therefore to be understood that the invention may be practiced otherwise than as specifically described without actually departing from the spirit and scope of the present invention as defined by the appended claims.

What is claimed is:

1. A method comprising:
    a) providing aryl halide functionalized carbon nanotubes;
        wherein the aryl halide comprises a halide selected from the group consisting of chlorine, bromine, iodine, and combinations thereof;
    b) dispersing the aryl halide functionalized carbon nanotubes in a solvent;
    c) adding an alkyllithium species to the solvent,
        wherein the alkyllithium species reacts with the aryl halide functionalized carbon nanotubes to form an aryl-lithium species;
            wherein the aryl-lithium species comprises a polymerizable species on the carbon nanotubes; and
            wherein the polymerizable species comprises aryl-lithium covalent bonds;
    d) adding a monomer to the solvent; and
    e) initiating a polymerization reaction between the monomer and the polymerizable species to form a polymer-carbon nanotube material,
        wherein a polymer comprising the polymer-carbon nanotube material is covalently bound to the carbon nanotubes; and
        wherein the polymerization reaction is selected from the group consisting of anionic polymerization and ring opening polymerization.

2. A method comprising:
    a) providing aryl halide functionalized carbon nanotubes;
        wherein the aryl halide comprises a halide selected from the group consisting of chlorine, bromine, iodine, and combinations thereof;
    b) dispersing the aryl halide functionalized carbon nanotubes in a solvent;
    c) adding a metal to the solvent, wherein the metal reacts with the aryl halide functionalized carbon nanotubes to form an aryl-metal species;
wherein the aryl-metal species comprises a polymerizable species on the carbon nanotubes; and
wherein the polymerizable species comprises aryl-metal covalent bonds;
d) adding a monomer to the solvent; and
e) initiating a polymerization reaction between the monomer and the polymerizable species to form a polymer-carbon nanotube material,
wherein a polymer comprising the polymer-carbon nanotube material is covalently bound to the carbon nanotubes; and
wherein the polymerization reaction is selected from the group consisting of anionic polymerization and ring opening polymerization.

3. The method of claim 2, wherein the metal is selected from the group consisting of zinc, nickel, potassium, sodium, lithium, magnesium, cesium, palladium, and combinations thereof.

4. The method of claim 2, wherein the metal is Mg, wherein the aryl-Mg bonds are aryl-Mg bonds comprising a Grignard species.

5. The method of any one of claims 1-4, wherein the aryl halides are bonded to the sidewall of the aryl halide functionalized carbon nanotubes.

6. The method of any one of claims 1-4, wherein the aryl halide is an aryl bromide.

7. The method of claim 1, wherein the alkyllithium species is n-butyllithium.

8. A method comprising:
a) providing functionalized carbon nanotubes,
wherein the functionalized carbon nanotubes comprise nucleation sites operable for initiating a polymerization reaction after deprotonation of said nucleation sites to form initiator groups;
wherein the polymerization reaction is selected from the group consisting of anionic polymerization and ring opening polymerization;
b) dispersing the functionalized carbon nanotubes in a solvent;
c) adding a deprotonating agent to the solvent,
wherein the deprotonating agent deprotonates the nucleation sites to form initiator groups operable for initiating the polymerization reaction;
d) adding a monomer to the solvent; and
e) initiating a polymerization reaction between the monomer and the initiator groups to form a polymer-carbon nanotube material,
wherein a polymer comprising the polymer-carbon nanotube material is covalently bound to the carbon nanotubes; and
wherein the polymerization reaction is selected from the group consisting of anionic polymerization and ring opening polymerization.

9. The method of claim 8, wherein the nucleation sites comprise at least one element selected from the group consisting of carbon, sulfur, oxygen, and nitrogen.

10. The method of claim 8, wherein the functionalized carbon nanotubes are selected from the group consisting of phenol functionalized carbon nanotubes, thiophenol functionalized carbon nanotubes, phenethyl alcohol functionalized nanotubes ($CNT-C_6H_4-CH_2CH_2OH$), $CNT-C_6H_4-NHBoc$, and combinations thereof.

11. The method of any one of claims 8-10, wherein the nucleation sites are on the sidewall of the functionalized carbon nanotubes.

12. The method of any one of claims 8-10, wherein the deprotonating agent comprises a base.

13. The method of claim 12, wherein the base is selected from the group consisting of KOH, KH, NaOH, NaH, and potassium hexamethyldisilazide.

14. The method of any one of claims 8-10, wherein the deprotonating agent comprises a metal operable for deprotonating the nucleation sites.

15. The method of claim 14, wherein the metal is selected from the group consisting of zinc, nickel, potassium, sodium, lithium, magnesium, cesium, palladium, and combinations thereof.

16. The method of any one of claim 1-4 or 8-10, wherein the initiating step comprises initiating anionic polymerization.

17. The method of any one of claim 1-4 or 8-10, wherein the initiating step comprises initiating ring opening polymerization.

18. The method of any one of claim 1-4 or 8-10, wherein the functionalized carbon nanotubes are single-wall carbon nanotubes.

19. The method of any one of claim 1-4 or 8-10, wherein the solvent is tetrahydrofuran.

20. The method of any one of claim 1-4 or 8-10, wherein the monomer is selected from the group consisting of styrene, acrylates, methyl acrylates, vinyl acetate, vinyl pyridines, isoprene, butadiene, chloroprene, acrylonitrile, maleic anhydride, and combinations thereof.

21. The method of any one of claim 1-4 or 8-10, wherein the monomer comprises styrene.

22. The method of any one of claim 1-4 or 8-10, further comprising adding a terminating agent suitable for terminating the polymerization reaction.

23. The method of claim 22, wherein the terminating agent is selected from the group consisting of ethanol, acetaldehyde, trimethylsilyl chloride, and combinations thereof.

24. The method of claim 22, wherein the terminating agent is ethanol.

25. The method of any one of claim 1-4 or 8-10, wherein a concentration of the monomer is between about 0.03 and about 0.16 g/ml.

26. The method of any one of claim 1-4 or 8-10, wherein the initiating step occurs at a temperature between about 0° C. and about 50° C.

27. The method of any one of claim 1-4 or 8-10, further comprising adding a polymerization catalyst to the solvent.

28. The method of claim 27, wherein the polymerization catalyst comprises $TiCl_4$.

29. The method of any one of claim 1-4 or 8-10, further comprising a step of utilizing the polymer-carbon nanotube material in a drug delivery process.

30. The method of any one of claim 1-4 or 8-10, further comprising a step of utilizing the polymer-carbon nanotube material for scaffolding to promote cellular tissue growth.

* * * * *